(12) United States Patent
Itoh

(10) Patent No.: US 11,299,195 B2
(45) Date of Patent: Apr. 12, 2022

(54) VEHICLE STEERING SYSTEM

(71) Applicant: Toyota Jidosha Kabushiki Kaisha, Toyota (JP)

(72) Inventor: Koichi Itoh, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 16/449,789

(22) Filed: Jun. 24, 2019

(65) Prior Publication Data
US 2019/0389504 A1 Dec. 26, 2019

(30) Foreign Application Priority Data

Jun. 26, 2018 (JP) .............................. JP2018-120486

(51) Int. Cl.
*B62D 5/04* (2006.01)

(52) U.S. Cl.
CPC ............. *B62D 5/049* (2013.01); *B62D 5/046* (2013.01); *B62D 5/0484* (2013.01)

(58) Field of Classification Search
CPC ...... B62D 5/049; B62D 5/046; B62D 15/022; B62D 15/021; B62D 5/0484
See application file for complete search history.

(56) References Cited

U.S. PATENT DOCUMENTS

| | | | | |
|---|---|---|---|---|
| 9,988,080 | B2 * | 6/2018 | Sasaki | B62D 5/046 |
| 2006/0015231 | A1 * | 1/2006 | Yoshimura | B60T 7/12 |
| | | | | 701/48 |
| 2006/0220607 | A1 | 10/2006 | Imagawa et al. | |
| 2006/0278466 | A1 * | 12/2006 | Cheng | B62D 5/04 |
| | | | | 180/444 |
| 2014/0172236 | A1 * | 6/2014 | Nishikawa | B62D 6/00 |
| | | | | 701/42 |
| 2015/0239492 | A1 * | 8/2015 | Yukitake | B62D 5/049 |
| | | | | 701/43 |
| 2016/0229445 | A1 * | 8/2016 | Sasaki | B62D 5/046 |

(Continued)

FOREIGN PATENT DOCUMENTS

| | | |
|---|---|---|
| DE | 102013112169 A1 | 5/2015 |
| DE | 112014004320 T5 | 7/2016 |

(Continued)

*Primary Examiner* — Jeff A Burke
*Assistant Examiner* — Joshua Alexander Garza
(74) *Attorney, Agent, or Firm* — Dinsmore & Shohl LLP

(57) ABSTRACT

A vehicle steering system, including: a steering actuator including an electric motor, a steering rod configured to steer a wheel by a steering amount, and a motion converting mechanism configured to convert a rotating motion of a motor rotation shaft into a motion of the steering rod; first and second motor rotation angle sensors configured to detect a motor rotation angle; a steering amount sensor configured to detect a motion amount of the steering rod as the steering amount; and a controller configured to execute a steering amount control and to perform detection-value inappropriateness determination in which it is determined that any one or two of a detection value of the first motor rotation angle sensor, a detection value of the second motor rotation angle sensor, and a detection value of the steering amount sensor are inappropriate based on comparison among the detection values.

11 Claims, 6 Drawing Sheets

(56) References Cited

U.S. PATENT DOCUMENTS

| | | | |
|---|---|---|---|
| 2017/0151978 A1* | 6/2017 | Oya | B62D 15/0235 |
| 2019/0002015 A1* | 1/2019 | Hwang | B62D 3/12 |
| 2019/0359252 A1* | 11/2019 | Yu | G06F 17/142 |
| 2020/0207408 A1* | 7/2020 | Nakamura | B62D 5/049 |
| 2021/0053612 A1* | 2/2021 | Kondo | B62D 5/0424 |

FOREIGN PATENT DOCUMENTS

| | | |
|---|---|---|
| JP | 2005-001609 A | 1/2005 |
| JP | 2006-143102 A | 6/2006 |
| JP | 2006-273155 A | 10/2006 |
| JP | 2006-306166 A | 11/2006 |
| JP | 2015-058911 A | 3/2015 |

* cited by examiner

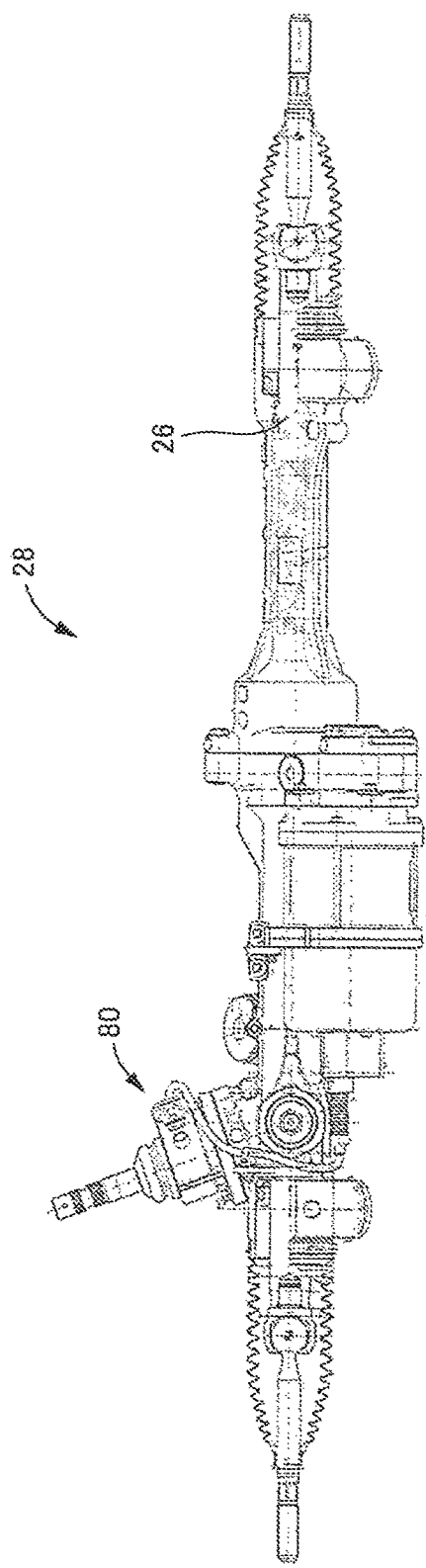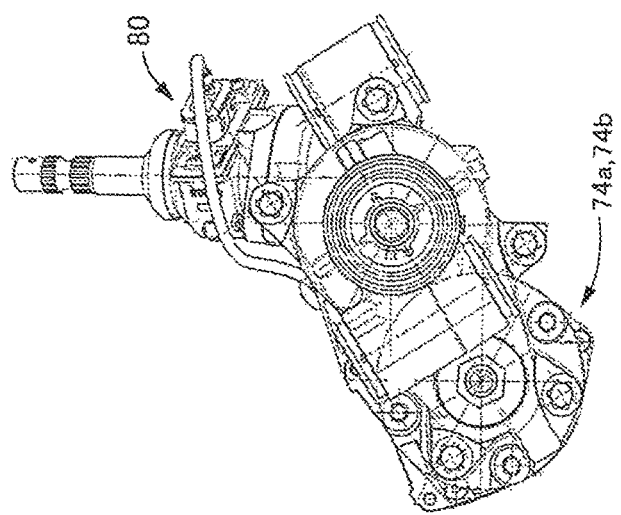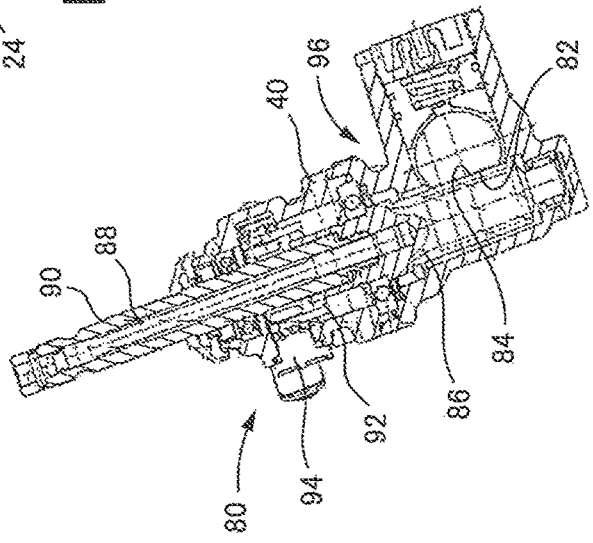
FIG.2A
FIG.2B
FIG.2C

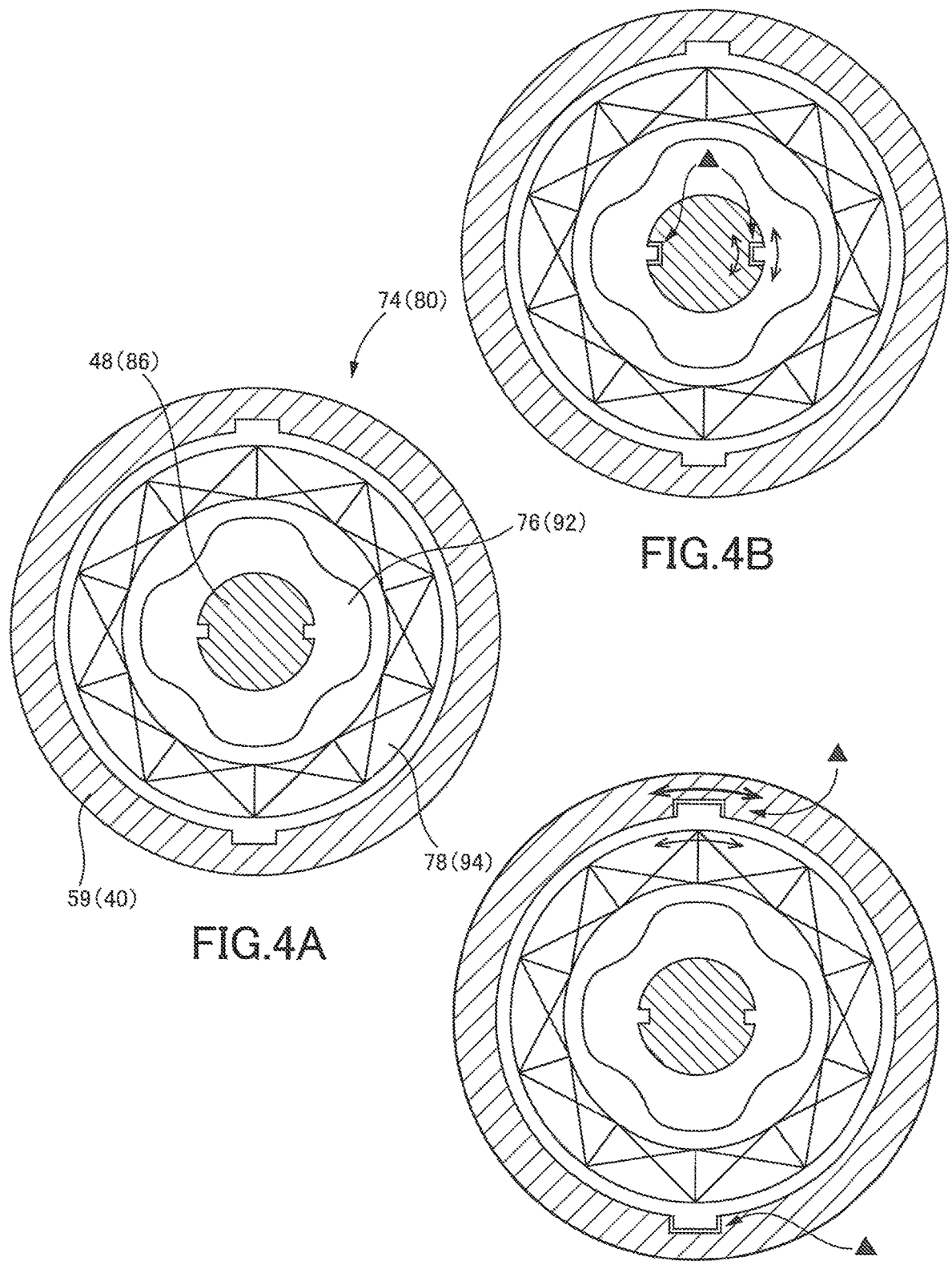

VEHICLE STEERING SYSTEM

CROSS REFERENCE TO RELATED APPLICATION

The present application claims priority from Japanese Patent Application No. 2018-120486, which was filed on Jun. 26, 2018, the disclosure of which is herein incorporated by reference in its entirety.

BACKGROUND

Technical Field

The following disclosure relates to a steering system installed on vehicles.

Description of Related Art

A steering system including an electric motor and utilizing a force exerted by the electric motor is configured such that the electric motor is controlled based on detection values of various sensors. For instance, Japanese Patent Application Publication No. 2015-58911 discloses a power steering system in which a steering force applied to a steering wheel (as one kind of a steering operation member) is assisted by the force of the electric motor. In the disclosed system, the detection values of a plurality of sensors are compared. In the case where some of the detection values are inconsistent with other detection values, it is determined that any of the detection values is inappropriate based on majority rule.

SUMMARY

To determine which detection values of the sensors are inappropriate, the disclosed steering system requires at least two sensors that are identical in function, e.g., a main sensor and a sub sensor. In the meantime, another steering system is known which is configured to control a steering amount of wheels by controlling the electric motor, that is, a steer-by-wire steering system is known. The steer-by-wire steering system employs sensors mutually different in function. Due to the difference in function among the sensors, the steer-by-wire steering system cannot employ, as it is, the above-indicated technique of determining the inappropriate sensor detection values utilized in the disclosed power steering system. Accordingly, one aspect of the present disclosure is directed to a vehicle steering system of a steer-by-wire type configured to easily make a determination of the inappropriate sensor detection value/values.

According to one aspect of the disclosure, a vehicle steering system includes: a steering actuator including i) a two-system electric motor having a motor rotation shaft, ii) a steering rod connected to a wheel and configured to steer the wheel by a steering amount corresponding to a motion amount thereof, and iii) a motion converting mechanism configured to convert a rotating motion of the motor rotation shaft into a motion of the steering rod in the motion amount corresponding to an amount of the rotating motion; a first motor rotation angle sensor and a second motor rotation angle sensor provided so as to respectively correspond to the two systems of the electric motor and each configured to detect a motor rotation angle that is a rotation angle of the motor rotation shaft; a steering amount sensor configured to detect, as the steering amount of the wheel, the motion amount of the steering rod or a motion amount of a movable member in the case where the steering actuator includes a movable-member moving mechanism configured to move the movable member in the motion amount corresponding to the motion amount of the steering rod; and a controller configured to execute a steering amount control of controlling the steering amount of the wheel by controlling an operation of the electric motor. The controller is configured to perform detection-value inappropriateness determination in which it is determined that any one or two of a detection value of the first motor rotation angle sensor, a detection value of the second motor rotation angle sensor, and a detection value of the steering amount sensor are inappropriate based on comparison among the detection values.

The vehicle steering system (hereinafter simply referred to as "steering system" where appropriate) according to the present disclosure is a redundant steer-by-wire steering system in which the electric motor includes two systems. In the present steering system, it is possible to easily determine which detection value or values are inappropriate based on the detection values of the two motor rotation angle sensors respectively corresponding to the two systems and the detection value of one steering amount sensor configured to detect the steering amount of the wheel.

VARIOUS FORMS

The present steering system may be configured such that the steering amount control is executable based on the detection value of the first motor rotation angle sensor, executable based on the detection value of the second motor rotation angle sensor, and executable based on the detection value of the steering amount sensor. In the case where any one or two of the detection values are determined to be inappropriate in the detection-value inappropriateness determination, the steering amount control can be executed without utilizing the detection value/values determined to be inappropriate. For instance, a configuration is considered in which one of the two systems of the electric motor is controlled based on the detection value of the first motor rotation angle sensor and the other of the two systems is controlled based on the detection value of the second motor rotation angle sensor. In the case where the detection value of one of the first and second motor rotation angle sensors is determined to be inappropriate, both the two systems may be controlled based on the detection value of the other of the first and second motor rotation angle sensors. Further, the amount of the rotating motion of the motor rotation shaft of the electric motor may be regarded as a cumulative sum of change amounts of the motor rotation angle, and a ratio between the amount of the rotating motion of the motor rotation shaft and the steering amount of the wheel may be regarded as a set ratio that depends on the structure of the motion converting mechanism. Thus, in the case where the detection values of both the first and the second motor rotation angle sensors are determined to be inappropriate, the two systems may be controlled based on the detection value of the steering amount sensor.

As each of the first and second motor rotation angle sensors of the steering system according to the present disclosure, there is employable one configured to detect the rotation angle of the motor rotation shaft, i.e., the rotational phase, for electric current supply to the electric motor. For instance, a resolver, a rotary encoder or the like is employable as each of the first and second motor rotation angle sensors. Like known motor rotation angle sensors, each of the first and second motor rotation angle sensors is generally constructed such that a to-be-detected element that is an element to be detected is attached, as a rotor, to the motor rotation shaft and a detecting element that is an element for detecting the to-be-detected element is attached, as a stator, to a housing of the electric motor.

As the steering amount sensor of the steering system according to the present disclosure, there is employable one that is capable of directly detecting the motion amount of the steering rod as the steering amount of the wheel. For instance, a linear encoder or the like is employable. In this case, the steering amount sensor is constructed such that the to-be-detected element is attached, as a mover, to the steering rod and the detecting element is attached, as a stator, to the housing of the steering actuator. Further, there is employable, as the steering amount sensor, one that is capable of indirectly detecting the motion amount of the steering rod as the steering amount of the wheel. For instance, a configuration is considered in which the steering actuator includes, like an ordinary steering device of known power steering systems, a rack-and-pinion mechanism, namely, a converting mechanism including a rack provided on the steering rod and a rotation shaft on which is provided a pinion meshing with the rack and configured to convert the rotating motion of the rotation shaft and the motion of the steering rod relative to each other. In this configuration, there is employable, as the steering amount sensor, one that is capable of detecting the rotation amount of the rotation shaft. Examples of such a steering amount sensor include a resolver, an encoder and the like. Further, there is employable a sensor for detecting an operating angle of a steering wheel (as a steering operation member), i.e., a steering sensor. In this respect, the steering sensor is convenient because the steering sensor can detect not only the phase of the rotation shaft within 360° but also an absolute rotation amount beyond 360°.

The steering actuator that employs the rack-and-pinion mechanism described above can utilize an ordinary steering device of known power steering systems by disconnecting the rotation shaft (pinion shaft) and the steering wheel from each other. In the case where the steering actuator utilizes the ordinary steering device, the steering amount sensor can be installed without any additional or special work, in place of an operation torque sensor installed on the rotation shaft in the ordinary steering device. In this respect, the rack-and-pinion mechanism is considered as a movable-member moving mechanism in which the rotation shaft functions as a movable member and which is configured to move the movable member in a motion amount corresponding to the motion amount of the steering rod.

The motion converting mechanism employed in the steering actuator of the present steering system may include a screw mechanism. For instance, the screw mechanism includes a screw provided on the steering rod and a nut which is provided with a screw threadedly engaging with the screw of the steering rod and which is fitted over the steering rod. Further, in the case where the electric motor is disposed such that the motor rotation shaft is parallel to the steering rod, the motion converting mechanism may include a belt transmission mechanism that includes a transmission belt for permitting the nut to rotate by the rotating motion of the electric motor.

The detection-value inappropriateness determination by the controller in the present steering system is performed by making a comparison among the detection value of the first motor rotation angle sensor, the detection value of the second motor rotation angle sensor, and the detection value of the steering amount sensor. Specifically, the detection-value inappropriateness determination is performed by judging whether or not the detection values are consistent with each other, for instance. As explained above, the ratio between the amount of the rotating motion of the motor rotation shaft and the steering amount is the set ratio. Thus, one of: the detection values of the first and second motor rotation angle sensors; and the detection value of the steering amount sensor is converted, based on the ratio, into the other of: the detection values of the first and second motor rotation angle sensors; and the detection value of the steering amount sensor, whereby it is possible to easily judge whether or not the detection values are consistent with each other. In this respect, it is judged that the detection values of the first and second motor rotation angle sensors and the detection value of the steering amount sensor are inconsistent with each other when a difference therebetween is larger than a threshold that is small to a certain extent.

Whether or not a sensor itself is normal, in other words, whether or not a sensor itself is suffering from a failure, is generally determined by a diagnostic function of the controller (that is referred to as "self-diagnostic function"). In view of this, the detection-value inappropriateness determination in the present steering system, i.e., the detection-value inappropriateness determination by a comparison among the detection values of the first motor rotation angle sensor, the second motor rotation angle sensor, and the steering amount sensor, is performed on condition that none of the first motor rotation angle sensor, the second motor rotation angle sensor, and the steering amount sensor themselves are suffering from a failure. The detection-value inappropriateness determination performed under the condition allows a process for the determination to be simplified, that is, allows simplification of the process by identifying factors responsible for inappropriateness of the detection value/values.

Here, the factors responsible for inappropriateness of the detection value of each of the first and second motor rotation angle sensors and the steering amount sensor are considered. In the present steering system, in the case where the stator of each of the first and second motor rotation angle sensors is attached to the housing of the electric motor and the rotor thereof is attached to the motor rotation shaft as described above, the detection value of each of the first and second motor rotation angle sensors becomes inappropriate when a fitting failure of the stator or the rotor occurs. Similarly, in the case where the stator of the steering amount sensor is attached to the housing of the steering actuator and the mover thereof is attached to the steering rod or the movable member as described above, the detection value of the steering amount sensor becomes inappropriate when a fitting failure of the stator or the mover occurs. The fitting failure indicates a state in which fitting of the stator, the rotor, or the mover is loosened and the stator, the rotor, or the mover wobbles, for instance. Further, the detection value of the steering amount sensor becomes inappropriate when a backlash or the like is large in the movable-member moving mechanism, e.g., in the rack-and-pinion mechanism, and looseness is accordingly generated. Next, the factors responsible for inconsistency between the detection values of the first and second motor rotation angle sensors and the detection value of the steering amount sensor are considered. When looseness occurs in the motion converting mechanism, more specifically, when slackness of the transmission belt or a backlash or the like in the screw mechanism becomes large, for instance, the detection values of the first and second motor rotation angle sensors are not consistent with the detection value of the steering amount sensor even though the detection value of the first motor rotation angle sensor and the detection value of the second motor rotation angle sensor are consistent with each other.

In view of the factors described above, in the case where the detection value of one of the first motor rotation angle sensor and the second motor rotation angle sensor is inconsistent with the detection value of the steering amount sensor and the detection value of the other of the first motor rotation angle sensor and the second motor rotation angle sensor is consistent with the detection value of the steering amount sensor, the detection value of the one of the first motor rotation angle sensor and the second motor rotation angle sensor is determined to be inappropriate in the detection-value inappropriateness determination due to the fitting failure of the stator or the rotor in the one of the first motor rotation angle sensor and the second motor rotation angle sensor.

On the other hand, in the case where the detection value of the first motor rotation angle sensor and the detection value of the second motor rotation angle sensor are consistent with each other and the detection values of the first motor rotation angle sensor and the second motor rotation angle sensor are inconsistent with the detection value of the steering amount sensor, it is impossible to identify whether the detection values of the first motor rotation angle sensor and the second motor rotation angle sensor are inappropriate or whether the detection value of the steering amount sensor is inappropriate, solely based on the fact of consistency and inconsistency. Nevertheless, it is possible to determine in the present system that one of: the detection values of the first motor rotation angle sensor and the second motor rotation angle sensor; and the detection value of the steering amount sensor is inappropriate. Such determination is made as sensor-function-based inappropriateness determination. The determination is named in view of the functions of the first motor rotation angle sensor, the second motor rotation angle sensor, and the steering amount sensor.

To identify whether the detection values of the first motor rotation angle sensor and the second motor rotation angle sensor are inappropriate or whether the detection value of the steering amount sensor is inappropriate, the sensor-function-based inappropriateness determination may be performed based on the presence or absence of a delay of a decrease in the detection value of the steering amount sensor generated when the electric motor starts to be controlled for decreasing the steering amount that has been increased. In view of the factors described above, when the fitting failure occurs in the stator or the mover of the steering amount sensor or when the looseness is generated in the movable-member moving mechanism, the decrease in the detection value of the steering amount sensor is delayed arising from the fitting failure or the looseness by a time corresponding to looseness in the fitting of the stator or the mover or by a time corresponding to the looseness in the movable-member moving mechanism, for instance. Thus, the detection value of the steering amount sensor is determined to be inappropriate in the case where the delay of the decrease in the detection value of the steering amount sensor is being generated. On the other hand, even if the looseness is generated in the motion converting mechanism, the delay of the decrease in the detection value of the steering amount sensor is not generated. Thus, in the case where the delay of the decrease in the detection value of the steering amount sensor is not being generated, the detection values of the first motor rotation angle sensor and the second motor rotation angle sensor are determined to be inappropriate due to the looseness in the motion converting mechanism. In other words, it is determined that the detection values of the first motor rotation angle sensor and the second motor rotation angle sensor should not be used in the steering amount control.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 2A is a view for explaining a structure of a steering actuator in the vehicle steering system according to the embodiment, FIG. 2B is a view for explaining a structure of a steering actuator in the vehicle steering system according to the embodiment, and FIG. 2C is a view for explaining a structure of a steering actuator in the vehicle steering system according to the embodiment;

FIG. 4A is a view schematically illustrating a fitting state of a sensor in the vehicle steering system according to the embodiment, FIG. 4B is a view schematically illustrating a fitting state of a sensor in the vehicle steering system according to the embodiment, and FIG. 4C is a view schematically illustrating a fitting state of a sensor in the vehicle steering system according to the embodiment;

DETAILED DESCRIPTION OF THE EMBODIMENT

Figure 1:
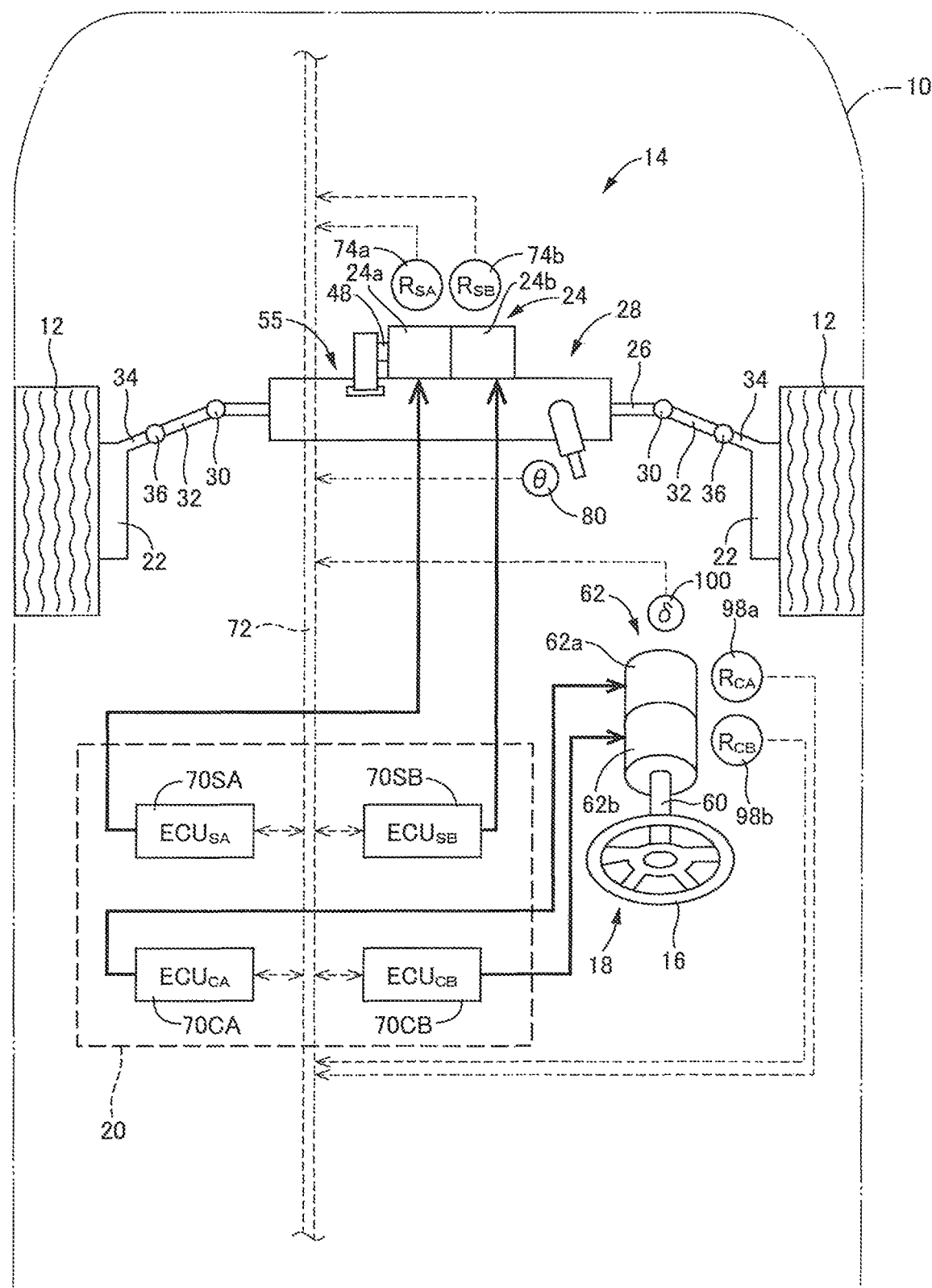
FIG. 1 is a schematic view illustrating an overall structure of a vehicle steering system according to one embodiment.

Referring to the drawings, there will be explained below in detail a vehicle steering system according to one embodiment. It is to be understood that the present disclosure is not limited to the details of the following embodiment and forms described above but may be changed and modified based on the knowledge of those skilled in the art.

A. Structure of Vehicle Steering System i) Overall Structure

As schematically illustrated in FIG. 1, a vehicle steering system (hereinafter simply referred to as "steering system" where appropriate) according to one embodiment is a steer-by-wire steering system configured to steer front right and left wheels 12 of a vehicle 10. The steering system includes a steering device 14 configured to steer the wheels 12, an operation device 18 including a steering wheel 16 as an operation member to be operated by a driver, and a controller 20 configured to control the steering device 14 to perform steering of the wheels 12 in accordance with an operation of the steering wheel 16.

Each wheel 12 is rotatably held by a corresponding steering knuckle 22 that is pivotably supported by a vehicle body via a corresponding suspension apparatus. The steering device 14 includes: a steering actuator 28 including a steering motor 24 (that is an electric motor as a drive source)

and configured to move a steering rod 26 in the right-left direction; and link rods 32, one end of each of which is coupled to a corresponding one of opposite ends of the steering rod 26 via a ball joint 30. The other end of each link rod 32 is coupled, via a ball joint 36, to a knuckle arm 34 of the corresponding steering knuckle 22. The steering knuckles 22 are pivoted by the movement of the steering rod 26 in the right-left direction, whereby the wheels 12 are steered.

ii) Basic Structure of Steering Actuator

Figure 3:
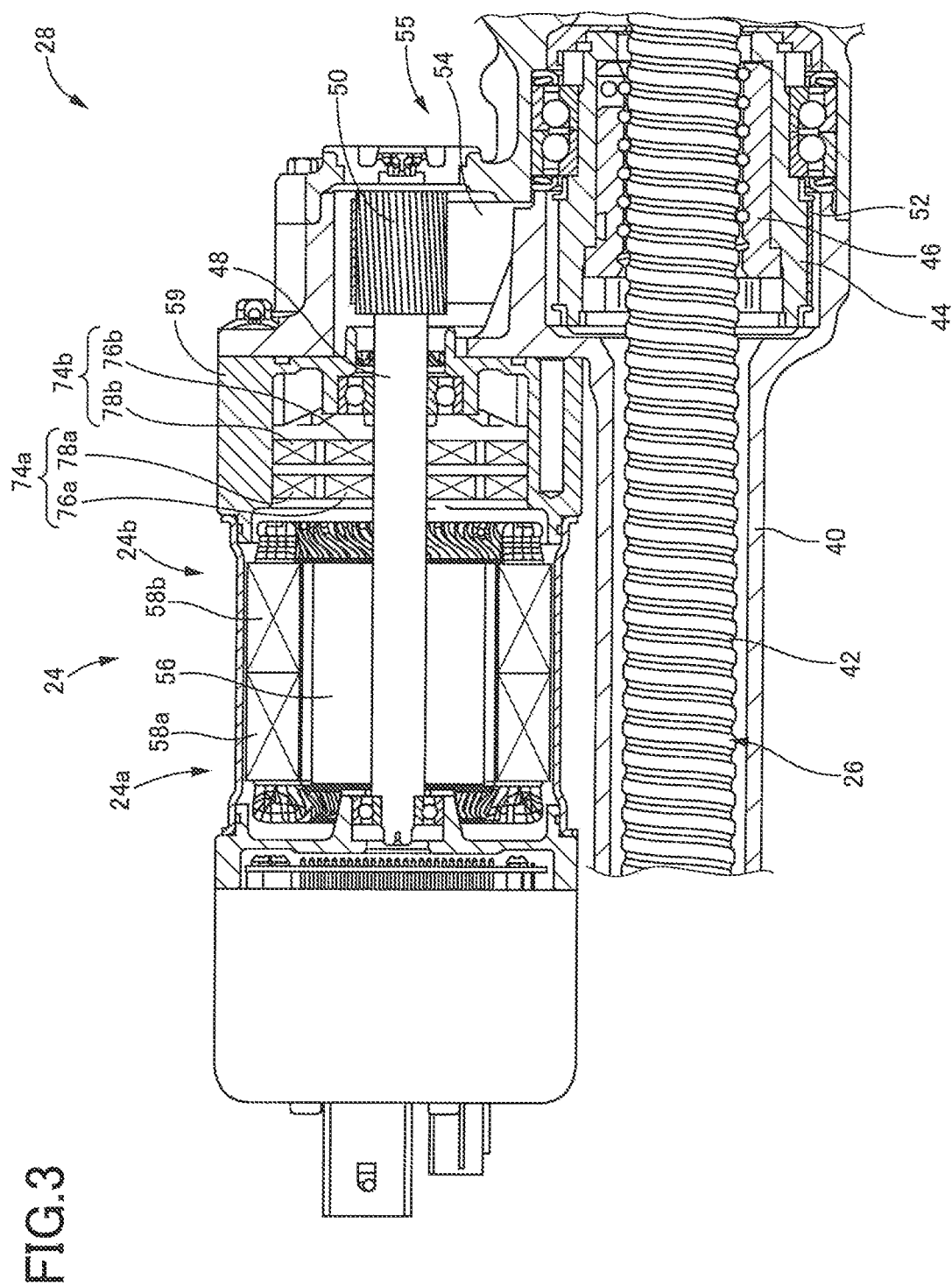
FIG. 3 is a view for explaining a steering motor and a motion converting mechanism of the steering actuator illustrated in FIG. 2.

Referring also to FIGS. 2 and 3, a basic structure of the steering actuator 28 of the steering device 14 will be explained. As apparent from FIG. 2A illustrating an overall external appearance of the steering actuator 28 and FIG. 3 illustrating an interior of the steering motor 24 and an interior of the steering actuator 28, the steering actuator 28 holds, in its housing 40, the steering rod 26 such that the steering rod 26 is unrotatable about an axis thereof and movable in the right-left direction. A screw groove 42 is formed on an outer circumference of the steering rod 26. A holding sleeve 44 is held in the housing 40 so as to be rotatable about an axis thereof and so as to be immovable in the right-left direction. A nut 46 holding bearing balls is fixedly held by the holding sleeve 44. The nut 46 and the steering rod 26 are threadedly engaged with each other and constitute a ball screw mechanism. In other words, it is considered that a screw mechanism is constituted by a screw on the steering rod 26 and the nut 46 provided with a screw threadedly engaging with the screw of the steering rod 26.

As shown in FIG. 3, the steering motor 24 is disposed outside the housing 40 such that its axis is parallel to an axis of the steering rod 26. A timing pulley 50 is attached to one end of a motor rotation shaft 48 (hereinafter simply referred to as "motor shaft 48" where appropriate). Like the timing pulley 50, the holding sleeve 44 includes engaging teeth 52 formed on its outer circumference. Thus, the holding sleeve 44 functions as another timing pulley that is paired with the timing pulley 50. A timing belt 54 as a transmission belt is wound around the holding sleeve 44 and the timing pulley 50. Rotation of the steering motor 24, strictly, rotation of the motor shaft 48, causes the nut 46 to be rotated, so that the steering rod 26 is moved rightward or leftward in accordance with the rotational direction of the steering motor 24. That is, a belt transmission mechanism is constituted by the holding sleeve 44, the timing pulley 50, and the timing belt 54. Further, a motion converting mechanism 55 is constituted by the belt transmission mechanism and the screw mechanism. The motion converting mechanism 55 is configured to convert the rotating motion of the motor shaft 48 into the motion of the steering rod 26 in a motion amount corresponding to the amount of the rotating motion.

In the steering actuator 28 of the steering system, the steering motor 24 is disposed outside the housing 40 such that the axis of the motor shaft 48 and the axis of the steering rod 26 are parallel to each other. The steering actuator 28 is of a rod parallel type (that is also referred to as a rack parallel type). This type of the steering actuator is advantageous in that the steering actuator is applicable to various vehicle models by changing the steering motor depending on the steering force to be required while a main portion of the actuator such as the housing 40, the steering rod 26, etc., is allowed to be applied in common to various vehicle models.

The steering motor 24 in the present steering system is a three-phase brushless DC motor and includes two systems. Specifically, magnets 56 common to the two systems are fixed to an outer circumference of the motor shaft 48 so as to be arranged in the circumferential direction, and two sets of coils corresponding to the respective two systems, i.e., a set of coils 58a and a set of coils 58b, are held by a motor housing 59 of the steering motor 24 so as to be opposed to the magnets 56. The steering motor 24 is rotated by supplying electric current to one or both of the two sets of coils 58a, 58b. A torque generated by the steering motor 24, namely, a force that moves the steering rod 26 in the right-left direction, is generally proportional to a sum of electric currents supplied to the coils 58a, 58b. The steering motor 24 is the two-system motor, and the steering actuator 28 may be assumed to have two steering motors. In this case, as shown in FIG. 1, portions of the steering motor 24 corresponding to the respective two systems will be hereinafter referred to as a steering motor 24a and a steering motor 24b for convenience sake. Accordingly, the steering motors 24a, 24b may be regarded as two drive sources of the steering actuator 28.

iii) Structure of Operation Device

As shown in FIG. 1, the operation device 18 includes the steering wheel 16, a steering shaft 60 fixed to the steering wheel 16 and rotatable with the steering wheel 16, and a reaction force motor 62 that is an electric motor. A motor shaft of the reaction force motor 62 is integral with the steering shaft 60, and the reaction force motor 62 applies or gives a rotational torque to the steering wheel 16. The rotational torque functions as a reaction force (operation reaction force) with respect to an operation of the steering wheel 16 by the driver, i.e., a steering operation. Accordingly, the reaction force motor 62 constitutes a reaction force actuator.

Though a detailed structure of the reaction force motor 62 is not illustrated, the reaction force motor 62 is a two-system brushless DC motor, like the steering motor 24. Accordingly, the operation device 18 may be assumed to have two reaction force motors. In this case, as shown in FIG. 1, portions of the reaction force motor 62 corresponding to the respective two systems will be hereinafter referred to as a reaction force motor 62a and a reaction force motor 62b for convenience sake. The operation reaction force functions as a force to return the steering wheel 16 to a neutral position (at which the steering wheel 16 is operated neither rightward nor leftward). The operation reaction force is generated by supplying electric current to one of or both of the reaction force motors 62a, 62b. The operation reaction force has a magnitude generally proportional to a sum of electric currents supplied to the reaction force motors 62a, 62b.

iv) Structure of Controller

As shown in FIG. 1, the controller 20 configured to control the steering system includes four electronic control units (each abbreviated as "ECU") 70SA, 70SB, 70CA, 70CB. The ECUs 70SA, 70SB, 70CA, 70CB are respectively indicated in FIG. 1 as $[ECU_{SA}]$, $[ECU_{SB}]$, $[ECU_{CA}]$, $[ECU_{CB}]$. In the following explanation, a term "ECU 70" is used as a general term for each of the four ECUs 70SA, 70SB, 70CA, 70CB when it is not necessary to distinguish the four ECUs from each other.

The ECUs 70SA, 70SB control the steering device 14. Specifically, according to the two systems, the ECU 70SA controls the steering motor 24a of the steering actuator 28 while the ECU 70SB controls the steering motor 24b of the steering actuator 28. Each of the ECUs 70SA, 70SB is constituted by a computer including a CPU, a ROM, a RAM, etc., and an inverter as a drive circuit (driver) for a corresponding one of the steering motor 24a and the steering motor 24b. While not illustrated, the inverter of each ECU 70SA, 70SB is connected to a power source and supplies, to the corresponding one of the steering motor 24a and the steering motor 24b, a drive current based on a command of the computer. The steering motor 24a, 24b to which the drive current is supplied is operated by the drive current. In other words, the steering actuator 28 to which the drive current is supplied is operated by the drive current. In the following explanation, the ECUs 70SA, 70SB will be referred to as steering ECUs 70SA, 70SB, and a term "steering ECU 70S" is used as a general term for each of the steering ECUs 70SA, 70SB when it is not necessary to distinguish the two steering ECUs 70SA, 70SB from each other.

The ECUs 70CA, 70CB control the operation device 18. Specifically, according to the two systems, the ECU 70CA controls the reaction force motor 62a while the ECU 70CB controls the reaction force motor 62b, like the ECUs 70SA, 70SB. Each of ECUs 70CA, 70CB is constituted by a computer including a CPU, a ROM, a RAM, etc., and an inverter as a drive circuit (driver) for a corresponding one of the reaction force motor 62a and the reaction force motor 62b. While not illustrated, the inverter of each ECU 70CA, 70CB is connected to a power source and supplies, to the corresponding one of the reaction force motor 62a and the reaction force motor 62b, electric current based on a command of the computer. In the following explanation, the ECUs 70CA, 70CB will be referred to as reaction force ECUs 70CA, 70CB and a term "reaction force ECU 70C" is used as a general term for each of the reaction force ECUs 70CA, 70CB when it is not necessary to distinguish the two the reaction force ECUs 70CA, 70CB from each other. The vehicle 10 is equipped with a car area network or controllable area network (CAN) 72. The ECUs 70SA, 70SB, 70CA, 70CB are connected to the CAN 72 so as to be communicable with one another.

v) Sensors

The steering device 14 and the operation device 18 are provided with various sensors for detecting their operating states. The controller 20 controls the steering system based on detection values of the sensors. There will be hereinafter explained a function, a structure, and an installation manner of each sensor.

The steering motors 24a, 24b of the steering device 14 respectively include motor rotation angle sensors 74a, 74b (each of which is a resolver) according to the two systems of the steering motor 24. Each motor rotation angle sensor 74a, 74b is configured to detect a relative phase between the magnets 56 attached to the motor shaft 48 and the coils 58a or the coils 58b (that may be referred to as "electrical angle"). In other words, each motor rotation angle sensor 74a, 74b is configured to detect a motor rotation angle $R_S$ that is a rotation angle of the motor shaft 48. In this respect, one and the other of the motor rotation angle sensors 74a, 74b may be referred to as a first motor rotation angle sensor and a second motor rotation angle sensor, respectively.

Each of the motor rotation angle sensors 74a, 74b has a known structure, and its detailed explanation is dispensed with. As shown in FIG. 3, the motor rotation angle sensors 74a, 74b respectively include: rotors 76a, 76b, each as a to-be-detected element, attached to the motor shaft 48; and stators 78a, 78b, each as a detecting element, attached to the motor housing 59 so as to be opposed to the rotors 76a, 76b. In FIG. 1, the motor rotation angle sensors 74a, 74b are respectively indicated as [$R_{SA}$], [$R_{SB}$]. In the following explanation, each motor rotation angle sensor 74a, 74b, each rotor 76a, 76b, and each stator 78a, 78b will be generally referred to as "motor rotation angle sensor 74", "rotor 76", and "stator 78", respectively, when it is not necessary to distinguish the two systems.

The steering actuator 28 includes a steering amount sensor 80 (indicated as [θ] in FIG. 1). The steering actuator 28 is configured to detect, as a steering amount θ of the wheels 12, a motion amount of the steering rod 26, namely, a motion position of the steering rod 26 in the right-left direction. FIG. 28 illustrates, in cross section, a portion of the steering actuator 28 in which the steering amount sensor 80 is disposed. As illustrated in FIG. 21, a rack 82 is formed on the steering rod 26, and a pinion shaft 86 that includes a pinion 84 meshing with the rack 82 is held by the housing 40. The steering actuator 28 is an actuator employed in what is called power steering system, and the pinion shaft 86 is connected to an input shaft 90 via a torsion bar 88. In the present steering system, the steering amount sensor 80 is disposed, in place of a torque sensor for detecting an operation torque, at a position at which the torque sensor is disposed in the case where the steering actuator 28 is employed in the power steering system.

The steering amount sensor 80 is identical with what is called steering sensor for detecting an operation amount (operation angle) of the steering wheel and has a known structure. Thus, its detailed explanation is dispensed with. The steering amount sensor 80 includes a rotor 92, as a to-be-detected element, attached to the pinion shaft 86 and a stator 94, as a detecting element, attached to the housing 40 so as to be opposed to the rotor 92. In this respect, the rotor 92 is one kind of a mover. The steering amount sensor 80 is configured to detect an amount of a rotating motion of the pinion shaft 86 beyond 360° from a rotational position of the pinion shaft 86 when the steering rod 26 is positioned at a neutral position (at which the wheels are steered neither rightward nor leftward).

The pinion shaft 86 and the steering rod 26 constructed as described above constitute a rack-and-pinion mechanism. In the rack-and-pinion mechanism, the pinion shaft 86 functions as a rotary body configured to rotate in an amount corresponding to the motion amount of the steering rod 26, namely, a movable member configured to move in an amount corresponding to the motion amount of the steering rod 26. Thus, it is considered that the steering actuator 28 includes a movable-member moving mechanism 96 including the rack-and-pinion mechanism. Further, the steering amount sensor 80 is configured to indirectly detect the motion amount of the steering rod 26, i.e., the steering amount θ of the wheels 12, by detecting the amount of the rotating motion of the pinion shaft 86.

There may be employable, as the steering amount sensor, a linear encoder including a mover, as a to-be-detected element, attached to the steering rod 26 and a stator, as a detecting element, attached to the housing 40. The motion amount of the steering rod 26 may be directly detected by the thus constructed linear encoder as the steering amount sensor.

As apparent from FIG. 2A and FIG. 2C that is a view of the steering actuator 28 viewed in the axial direction, the steering actuator 28 includes the three sensors, i.e., the motor rotation angle sensors 74a, 74b and the steering amount sensor 80, at respective positions indicated in FIGS. 2A and 2C.

Like the steering motors 24a, 24b of the steering device 14, the reaction force motors 62a, 62b of the operation device 18 includes two motor rotation angle sensors 98a, 98b, each as a resolver, corresponding to the two systems of the reaction force motor 62. Each of the motor rotation angle sensors 98a, 98b is configured to detect a motor rotation angle $R_C$ of a motor shaft of the reaction force motor 62 that is integral with the steering shaft 60. The operation device 18 further includes an operation amount sensor 100 (what is called steering sensor) configured to detect an operation amount (operation angle) δ of the steering wheel 16. The motor rotation angle sensors 98a, 98b and the operation amount sensor 100 are similar in construction to the motor rotation angle sensors 74a, 74b and the steering amount sensor 80 and are similarly installed. Thus, a detailed explanation of the structures and installation manners thereof is dispensed with. In FIG. 1, the motor rotation angle sensors 98a, 98b and the operation amount sensor 100 are respectively indicated as [$R_{CA}$], [$R_{CB}$], [δ], In the following explanation, a term "motor rotation angle sensor 98" will be used as a general term for each of the motor rotation angle sensors 98a, 98b when it is not necessary to distinguish the two systems.

The motor rotation angle sensors 74a, 74b, the steering amount sensor 80, the motor rotation angle sensors 98a, 98b, and the operation amount sensor 100 are connected to the CAN 72. The detection values of the motor rotation angle $R_S$, the steering amount θ, the motor rotation angle $R_C$, and the operation amount δ detected by these sensors are sent to the controller 20 via the CAN 72.

[B] Basic Control of Vehicle Steering System

In the present steering system, each of the steering ECUs 70SA, 70SB executes a steering amount control, namely, a control of the steering amount θ of the wheels 12 by controlling the operation of the corresponding steering motor 24a, 24b, according to the two systems. Each of the reaction force ECUs 70CA, 70CB executes a reaction force control, namely, a control of the operation reaction force to be given to the steering wheel 16, according to the two systems. In the steering amount control, the steering ECUs 70SA, 70SB execute mutually the same control. In the reaction force control, the reaction force ECUs 70CA, 70CB execute mutually the same control such that each of the reaction force motors 62a, 62b generates a torque that bears a half of the operation reaction force to be given. Thus, there will be hereinafter explained the steering amount control in one of the two systems and the reaction force control in one of the two systems.

i) Steering Amount Control

The steering amount control is executed on condition that the steering ECU 70S has already executed a calibration processing for the detection value of the motor rotation angle sensor 74 at startup of the vehicle 10. Specifically, the steering amount θ of the wheels 12 detected by the steering amount sensor 80 and the motor rotation angle $R_S$ detected by the motor rotation angle sensor 74 are associated with each other. More specifically, a ratio between: a change amount of the motor rotation angle $R_S$, i.e., the amount of the rotating motion of the motor shaft 48; and the steering amount θ is equal to the set ratio γ determined depending on the structure of the motion converting mechanism 55. Based on the set ratio γ, the rotation amount of the motor shaft 48 (that is a cumulative rotation amount indicated beyond 360°) from a state in which the wheels 12 are not steered, i.e., a neutral state, is determined as a motor rotation amount Ω with respect to the steering amount θ at startup of the vehicle 10. In short, there is executed an origin setting processing in which the motor rotation amount Ω becomes equal to 0 when the steering amount θ becomes equal to 0.

In the steering amount control executed by the steering ECU 70S after the calibration processing has been executed, a target steering amount θ°, which is the steering amount θ of the wheels 12 to be attained, is determined based on the operation amount δ of the steering wheel 16 detected by the operation amount sensor 100. Specifically, the target steering amount θ° is determined by multiplying the operation amount δ by a set gain α. Based on the target steering amount θ° and the set ratio γ, a target motor rotation amount Ω°, which is the motor rotation amount Ω to be attained, is determined. It is noted that an actual motor rotation amount Ω at the present point in time is always updated by the motor rotation angle $R_S$ detected by the motor rotation angle sensor 74. A feedback control of the steering motor 24 is executed based on a motor rotation amount deviation ΔΩ (=Ω°−Ω) such that the motor rotation amount Ω becomes equal to the target motor rotation amount Ω°. In this respect, the motor rotation angle $R_S$ detected by the motor rotation angle sensor 74 is utilized in phase switching in electric current supply to the steering motor 24.

ii) Reaction Force Control

In the reaction force control, the reaction force ECU 70C controls the reaction force motor 62 such that the reaction force having a magnitude in accordance with the operation amount δ is given to the steering wheel 16. Specifically, the operation amount δ of the steering wheel 16 detected by the operation amount sensor 100 is equal to 0 when the steering wheel 16 is positioned at the neutral position at which the steering wheel 16 is operated neither rightward nor leftward. The reaction force ECU 70C determines a target reaction force F°, which is the reaction force F to be given, by multiplying the detected operation amount δ by a set gain β. Based on the target reaction force F°, there is determined electric current to be supplied to the reaction force motor 62, and the determined electric current is supplied to the reaction force motor 62. Also in the reaction force control, the motor rotation angle $R_C$ detected by the motor rotation angle sensor 98 is utilized in phase switching in electric current supply to the reaction force motor 62.

[C] Inappropriateness of Detection Values of Sensors in Steering Device

As explained above, the steering device 14 includes the two motor rotation angle sensors 74a, 74b and the steering amount sensor 80. The detection values of the sensors 74, 80 are used in the steering amount control. In the case where any one or two of the detection values of the sensors 74, 80 are inappropriate, in other words, the use of any one or two of the detection values of the sensors 74, 80 is not suitable, it is impossible to appropriately execute the steering amount control. Thus, there will be hereinafter explained causes of the inappropriate detection value/values of the sensors, determination of the inappropriate detection value/values, a flow of a process for making the determination, and measures to deal with the inappropriate detection value/values.

i) Causes of Inappropriate Detection Values of Sensors and Determination of Inappropriate Detection Value/Values In the case where any of the motor rotation angle sensors 74 and the steering amount sensor 80 is in failure, the detection value of the sensor suffering from the failure is inappropriate. Like ordinary controllers, the controller 20 of the present steering system has a diagnostic function of diagnosing the failure of the sensors 74, 80 themselves. Thus, the controller 20 determines which one of the detection values of the sensors 74, 80 is inappropriate.

Even though the sensors 74, 80 themselves are not in failure, the sensors 74, 80 may be suffering from poor fitting. FIG. 4A schematically illustrates a fitting state of the sensors 74, 80 in the case where the sensors 74, 80 are resolvers. As illustrated in FIG. 4A, each motor rotation angle sensor 74 is constructed such that the rotor 76 is attached to the motor shaft 48 and the stator 78 is attached to the motor housing 59 of the steering motor 24. Similarly, the steering amount sensor 80 is constructed such that the rotor 92 as the mover is attached to the pinion shaft 86 and the stator 94 is attached to the housing 40 of the steering actuator 28. In the case where fitting of the rotor 76, 92 to the motor shaft 48 or the pinion shaft 86 is loosened, that is, in the case where a certain degree of looseness occurs as indicated by "▲" in FIG. 48, it is expected that the rotor 76, 92 is not rotated with the motor shaft 48 or the pinion shaft 86 only for a short time. Similarly, in the case where fitting of the stator 78, 94 to the motor housing 59 or the housing 40 is loosened, that is, when a certain degree of looseness occurs as indicated by "▲" in FIG. 4C, it is expected that the rotor 76, 92 and the stator 78, 94 rotate together only for a short time. Accordingly, in the case where any one of the sensors 74, 80 suffers from poor fitting, the detection value of the motor rotation angle $R_S$ or the steering amount θ detected by any one of the sensors 74, 80 is inevitably inappropriate.

In the case where looseness occurs in the movable-member moving mechanism 96, that is, in the case where a backlash in the rack-and-pinion mechanism becomes large to a certain degree, for instance, the rotating motion of the pinion shaft 86 is delayed when the direction of the motion of the steering rod 26 is changed, so that the detection value of the steering amount θ by the steering amount sensor 80 is inappropriate.

In the case where looseness occurs in the motion converting mechanism 55, that is, in the case where a backlash in the ball screw mechanism, slackness of the transmission belt 54 (as the timing belt), or looseness in engagement between: the timing pulley 50 or the holding sleeve 44; and the timing belt 54 becomes large to a certain degree, the detection values of the motor rotation angle $R_S$ by the motor rotation angle sensors 74 and the detection value of the steering amount θ by the steering amount sensor 80 are not consistent with each other. In this case, one of: the detection values of the motor rotation angle sensors 74; and the detection value of the steering amount sensor 80 should not be used in the steering amount control. That is, it is needed to determine whether the detection values of the motor rotation angle sensors 74 are inappropriate or whether the detection value of the steering amount sensor 80 is inappropriate.

In the case where the sensors 74, 80 themselves are not in failure, it is impossible to determine whether the detection values of the sensors 74 are inappropriate or whether the detection value of the sensor 80 is inappropriate, solely based on the detection values thereof. The controller 20 in the present steering system is configured to compare the detection values of the sensors 74, 80 so as to determine which one of: the detection values of the sensors 74; and the detection value of the sensor 80 is inappropriate. In other words, the controller 20 performs determination as to the inappropriate detection value/values, that is, the controller 20 performs detection-value inappropriateness determination. Specifically, the controller 20 performs the determination as to the inappropriate detection value/values based on whether the detection values of the sensors 74, 80 are consistent with each other. The determination as to whether the detection values of the sensors 74a, 74b are consistent is made as follows. It is determined that the detection value of the motor rotation angle sensor 74a and the detection value of the motor rotation angle sensor 74b are inconsistent with each other when a difference therebetween is larger than a threshold that is set to be relatively small. The determination as to whether the detection values of the sensors 74a, 74b are consistent with the detection value of the sensor 80 is made as follows. Initially, one of: the detection value of the motor rotation angle sensor 74; and the detection value of the steering amount sensor 80 is converted based on the set ratio γ described above, and it is then determined that the detection value of the sensor 74 and the detection value of the sensor 80 are inconsistent with each other when a difference between (a) the converted value and (b) the other of: the detection value of the sensor 74; and the detection value of the sensor 80 is larger than a threshold that is set to be relatively small.

It is highly unlikely that two or more of events responsible for inappropriateness of the detection value/values described above happen at the same time. Accordingly, such a case is excluded from consideration. Therefore, the controller 20 makes the determination of the inappropriate detection value/values on the assumption that only one of the events that are responsible for inappropriateness of the detection value/values happens.

Because both the motor rotation angle sensors 74a, 74b detect the rotation angle of the motor shaft 48, it can be considered that the detection value of one of the motor rotation angle sensors 74a, 74b is inappropriate unless the detection values of the motor rotation angle sensors 74a, 74b are consistent or match with each other. Further, in the case where the detection value of one of the motor rotation angle sensors 74a, 74b is inconsistent with the detection value of the steering amount sensor 80 and the detection value of the other of the motor rotation angle sensors 74a, 741 is consistent with the detection value of the steering amount sensor 80, it is determined that the detection value of the one of the motor rotation angle sensors 74a, 74b is inappropriate due to the fitting failure of the one of the motor rotation angle sensors 74a, 74b.

Moreover, in the case where the detection values of the motor rotation angle sensors 74a, 74b are consistent with each other but inconsistent with the detection value of the steering amount sensor 80, it is determined that the detection values of the motor rotation angle sensors 74a, 74b or the detection value of the steering amount sensor 80 is inappropriate. That is, the controller 20 performs sensor-function-based inappropriateness determination. It is, however, impossible to determine which one of (a) the detection values of the motor rotation angle sensors 74a, 74b and (b) the detection value of the steering amount sensor 80 is inappropriate, solely based on the fact described above. Accordingly, the controller 20 determines, in the sensor-function-based inappropriateness determination, which one of (a) the detection values of the motor rotation angle sensors 74a, 74b and (b) the detection value of the steering amount sensor 80 is inappropriate based on the presence or absence of a delay of a decrease in the steering amount θ detected by the steering amount sensor 80, the delay being generated when the steering motor 24 starts to be operated for decreasing the steering amount θ in the steering amount control, that is, when a steering operation to return the steered steering wheel 16 to the neutral position is performed. (This steering operation will be hereinafter referred to as "returning steering operation" where appropriate.)

Figure 5A:
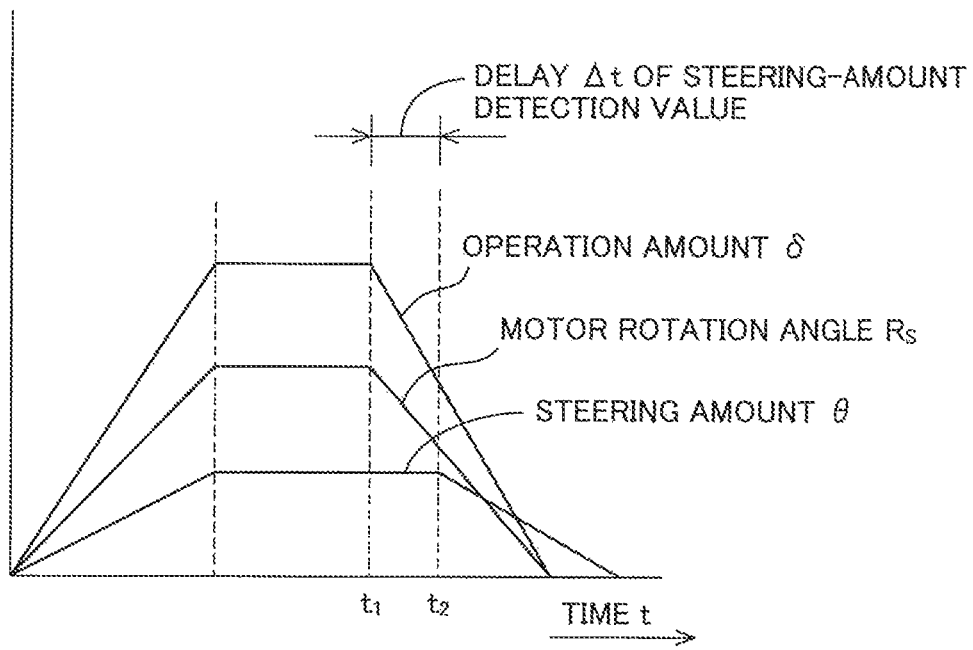
FIG. 5A is a graph for explaining a decrease in a detection value of a steering amount in a returning steering operation and FIG. 5B is a graph for explaining a decrease in a detection value of a steering amount in a returning steering operation.

The sensor-function-based inappropriateness determination will now be explained more specifically. When the vehicle 10 is running and the wheels 12 are steered to a certain degree of the steering amount θ, the wheels 12 are receiving, from the road surface, a force (restoring force) to decrease the steering amount θ. The force may be referred to as "self alignment torque" (SAT). In a situation in which the looseness occurs in the movable-member moving mechanism 96, namely, in the rack-and-pinion mechanism or in a situation in which the looseness due to the fitting failure of the steering amount sensor 80 occurs, when the steering motor 24 is controlled such that the steering amount θ is increased and subsequently decreased after the steering amount θ has been maintained, for instance, the motor rotation angle $R_S$ detected by the motor rotation angle sensor 74 decreases, in accordance with a change in the operation amount δ of the steering wheel 16 detected by the operation amount sensor 100, from a time point of the start of the control of the steering motor 24 for decreasing the steering amount θ, i.e., a time point t in the graph of FIG. 5A. In contrast, the steering amount θ decreases from a time point $t_2$ (in the graph of FIG. 5A) that is delayed due to the looseness described above by a time corresponding to the looseness described above. In this case, the controller 20 determines that the detection value of the steering amount sensor 80 is inappropriate due to the looseness in the movable-member moving mechanism 96 or the fitting failure of the steering amount sensor 80 when a delay Δt in the steering-amount detection value, which is a time difference between the time point $t_1$ and the time point $t_2$, is larger than a threshold time that is set to be relatively small.

Figure 5B:
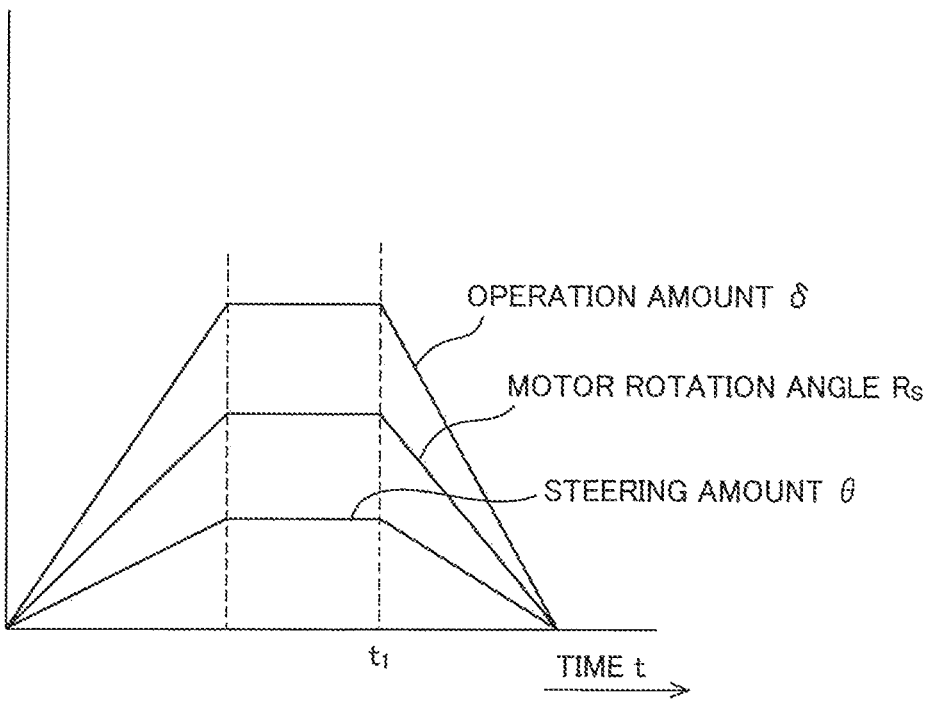

On the other hand, even if the looseness in the motion converting mechanism 55 (i.e., the backlash of the ball screw mechanism), the slackness of the timing belt 54 or the like exists in the situation in which the steering motor 24 is controlled for decreasing the steering amount θ, the steering amount θ detected by the steering amount sensor 80 starts to decrease substantially at the same time when the motor rotation angle $R_S$ detected by the motor rotation angle sensor 74 starts to decrease, as illustrated in the graph of FIG. 5B. That is, the steering amount θ starts to decrease from the time point $t_1$. In this case, the controller 20 determines that the detection values of both the motor rotation angle sensors 74a, 74b are inappropriate due to the looseness in the motion converting mechanism 55 when the delay Δt in the steering-amount detection value is not larger than the threshold time described above.

ii) Flow of Process for Determination of Inappropriate Detection Value/Values

Figure 6:
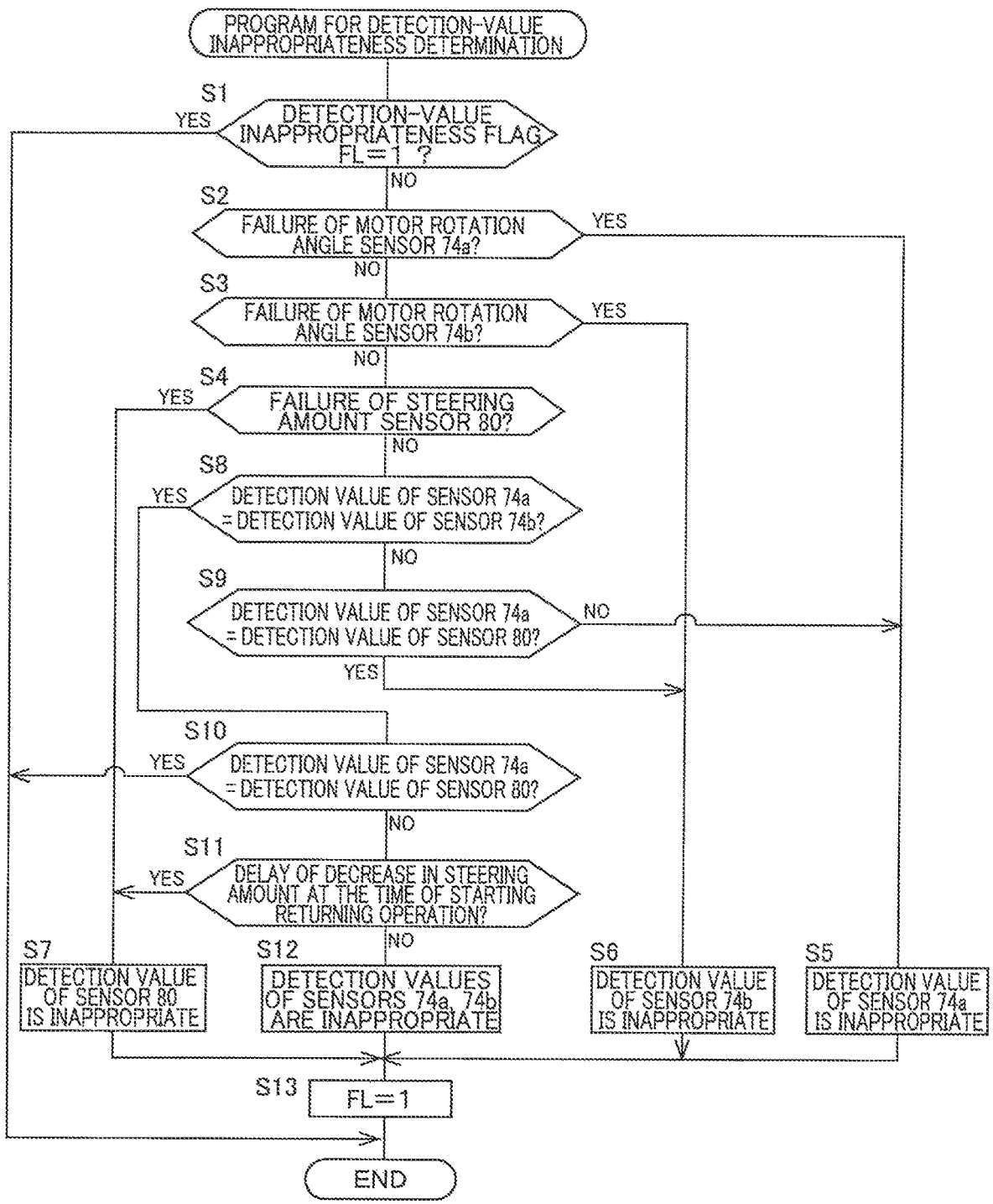
FIG. 6 is a flowchart indicating a program for detection-value inappropriateness determination executed by a controller in the vehicle steering system according to the embodiment.

A process for the determination of the inappropriate detection value/values is executed by the controller 20, specifically, by one of the two steering ECUs 70S, such that the one of the two steering ECUs 70S executes a program for detection-value inappropriateness determination indicated by a flowchart of FIG. 6 at a short time pitch, e.g., from several to several tens of milliseconds (msec), while the one of the two steering ECUs 70S is receiving information from the other of the two steering ECUs 70S. The process for the determination of the inappropriate detection value/values may be executed by each of the two steering ECUs 70S or by at least one of the two reaction force ECUs 70C. Alternatively, other ECU installed on the vehicle 10 may be regarded as an ECU that constitutes the controller 20, and the process for the determination of the inappropriate detection value/values may be executed by the ECU. Referring to the flowchart, there will be explained a control flow for the determination of the inappropriate detection value/values.

In the program for detection-value inappropriateness determination, a value of a detection-value inappropriateness flag FL is judged at Step 1. (Hereinafter, Step S1 will be abbreviated as "S1". Other steps will be similarly abbreviated.) An initial value of the detection-value inappropriateness flag FL is "0". The value of the flag FL is set to "1" when any one or two of the detection values of the sensors 74, 80 are inappropriate. When any one or two of the detection values of the sensors 74, 80 are already determined to be inappropriate, the program is not substantially executed.

When none of the detection values of the sensors 74, 80 are yet determined to be inappropriate, it is determined at S2-S4 whether any one of the sensors 74, 80 itself is in failure based on a result of diagnosis obtained by the diagnostic function of the controller 20. In view of a considerably low possibility that the failure of two or more of the sensors 74, 80 occurs at the same time, the determinations at S2-S4 are made on the assumption that only one of the sensors 74, 80 suffers from the failure.

When it is determined at S2 that the motor rotation angle sensor 74a is in failure, only the detection value of the motor rotation angle sensor 74a is determined to be inappropriate at S5. When it is determined at S3 that the motor rotation angle sensor 74b is in failure, only the detection value of the motor rotation angle sensor 74b is determined to be inappropriate at S6. When it is determined at S4 that the steering amount sensor 80 is in failure, only the detection value of the steering amount sensor 80 is determined to be inappropriate at S7.

When it is determined at S2-S4 that none of the sensors 74, 80 are not in failure, the control flow goes to S8 to compare the detection values of the motor rotation angle sensors 74a, 74b and to determine whether the detection values are consistent with each other. When the detection values of the motor rotation angle sensors 74a, 74b are inconsistent with each other, the control flow goes to S9 to compare the detection value of the motor rotation angle sensor 74a and the detection value of the steering amount sensor 80. When the detection values are inconsistent with each other, it is estimated that the fitting failure occurs in the motor rotation angle sensor 74a. In this case, only the detection value of the motor rotation angle sensor 74a is determined to be inappropriate at S5. On the other hand, when the detection value of the motor rotation angle sensor 74a and the detection value of the steering amount sensor 80 are consistent with each other, that is, when the detection value of the motor rotation angle sensor 74b is inconsistent with the detection value of the steering amount sensor 80, it is estimated that the fitting failure occurs in the motor rotation angle sensor 74b. In this case, only the detection value of the motor rotation angle sensor 74b is determined to be inappropriate at S6.

When it is determined at S8 that the detection values of the motor rotation angle sensors 74a, 74b are consistent with each other, the control flow goes to S10 at which the detection value of the motor rotation angle sensor 74a and the detection value of the steering amount sensor 80 are compared, as at S9. When the detection value of the motor rotation angle sensor 74a and the detection value of the steering amount sensor 80 are determined to be inconsistent with each other, that is, when the detection value of the steering amount sensor 80 is determined to be inconsistent with both the detection values of the motor rotation angle sensors 74a, 74b, it is determined at S11 whether the above-indicated delay of the decrease in the detection value of the steering amount sensor 80 is being generated, that is, whether the delay is being generated when the returning steering operation described above is performed during running of the vehicle 10. The value of the delay Δt of the steering-amount detection value is recognized and stored by the controller 20 every time the returning steering operation is performed, aside from the process according to the program. Based on the stored value, whether the delay is being generated or not is determined.

When it is determined at S11 that the delay of the decrease in the detection value of the steering amount sensor 80 is being generated, it is estimated that the looseness occurs in the movable-member moving mechanism 96, namely, in the rack-and-pinion mechanism or it is estimated that the fitting failure occurs in the steering amount sensor 80. In this case, only the detection value of the steering amount sensor 80 is determined to be inappropriate at S7. On the other hand, when it is determined that the delay is not being generated, it is estimated at S12 that the looseness in the motion converting mechanism 55 such as the slackening of the timing belt 54 or the backlash of the ball screw mechanism is increasing. In this case, both the detection values of the motor rotation angle sensor 74a and the motor rotation angle sensor 74b are determined to be inappropriate.

When it is determined at S5, S6, S7, S12 that any one or two of the detection values of the sensors 74, 80 are determined to be inappropriate, the value of the detection-value inappropriateness flag FL is set to "1" at S13. Thus, the process according to the program is ended. On the other hand, when it is determined at S10 that the detection value of the motor rotation angle sensor 74a and the detection value of the steering amount sensor 80 are consistent with each other, that is, when it is determined that the detection values of the three sensors 74, 80 are consistent with each other, all the detection values of the three sensors 74, 80 are determined to be appropriate. Thus, the process according to the program is ended.

iii) Measures to Address Inappropriate Detection Value/Values

In the case where any one or two of the detection values of the sensors 74, 80 are determined to be inappropriate, a message to that effect is displayed on an instrument panel, so that the driver of the vehicle 10 is notified of the message. Accordingly, the driver is encouraged to decide that maintenance or repair of the vehicle 10 should be performed. In some embodiments, in the steering amount control, the detection value/values determined to be inappropriate should not be employed. In view of this, the steering amount control is executed as described below as an emergency or temporary measure for avoiding the employment of the inappropriate detection value/values.

As explained above, the steering ECUs 70SA, 70SB execute the feedback control of the steering motor 24 in the steering amount control, based on the motor rotation angles $R_{SA}$, $R_{SB}$ detected respectively by the motor rotation angle sensors 74a, 74b. In the case where only the detection value of the motor rotation angle sensor 74a is determined to be inappropriate, the steering ECU 70SA executes the feedback control of the steering motor 24a and the phase switching in electric current supply to the steering motor 24a, based on the motor rotation angle $R_{SB}$ detected by the motor rotation angle sensor 74b in place of the motor rotation angle $R_{SA}$. On the other hand, in the case where only the detection value of the motor rotation angle sensor 74b is determined to be inappropriate, the steering ECU 70SB executes the feedback control of the steering motor 24b and the phase switching in electric current supply to the steering motor 24b, based on the motor rotation angle $R_{SA}$ detected by the motor rotation angle sensor 74a in place of the motor rotation angle $R_{SB}$.

In the case where both the detection values of the motor rotation angle sensors 74a, 74b are determined to be inappropriate, the feedback control of the steering motor 24 is executed based on the steering amount θ. Specifically, the feedback control of the steering motor 24 is executed based on a steering amount deviation Δθ (=θ°−θ), such that the steering amount θ detected by the steering amount sensor 80 becomes equal to the target steering amount θ' described above. It is noted that the motor rotation angles $R_{SA}$, $R_{SB}$ respectively detected by the motor rotation angle sensors 74a, 74b are respectively used in the phase switching in the electric current supply to the respective steering motors 24a, 24b.

In the case where the detection value of the steering amount sensor 80 is determined to be inappropriate, the calibration processing described above is not executed at startup of the vehicle 10. In this case, the steering ECUs 70SA, 70SB respectively store the motor rotation angles $R_{SA}$, $R_{SB}$ detected by the respective motor rotation angle sensors 74a, 74b at a time point when the vehicle 10 stops operating, and the origin setting process of the motor rotation amount Ω is executed at startup of the vehicle 10, based on the stored motor rotation angles $R_{SA}$, $R_{SB}$.

What is claimed is:

1. A vehicle steering system, comprising:
   a steering actuator including i) a two-system electric motor having a single motor rotation shaft, ii) a steering rod connected to a wheel and configured to steer the wheel by a steering amount corresponding to a motion amount thereof, and iii) a motion converting mechanism configured to convert a rotating motion of the single motor rotation shaft into a motion of the steering rod in the motion amount corresponding to an amount of the rotating motion;
   a first motor rotation angle sensor and a second motor rotation angle sensor provided so as to respectively correspond to the two systems of the electric motor and each configured to detect a motor rotation angle that is a rotation angle of the single motor rotation shaft;
   a steering amount sensor configured to detect, as the steering amount of the wheel, the motion amount of the steering rod or a motion amount of a movable member in a case where the steering actuator includes a movable-member moving mechanism configured to move the movable member in the motion amount corresponding to the motion amount of the steering rod; and
   a controller configured to execute a steering amount control of controlling the steering amount of the wheel by controlling an operation of the electric motor,
   wherein the controller is configured to perform detection-value inappropriateness determination in which it is determined that any one or two of a detection value of the first motor rotation angle sensor, a detection value of the second motor rotation angle sensor, and a detection value of the steering amount sensor are inappropriate based on comparison among the detection values.

2. The vehicle steering system according to claim 1, wherein the controller is configured to perform the detection-value inappropriateness determination on condition that none of the first motor rotation angle sensor, the second motor rotation angle sensor, and the steering amount sensor themselves are suffering from a failure.

3. The vehicle steering system according to claim 1, wherein the controller is configured to determine, in the detection-value inappropriateness determination, that the detection value of one of the first motor rotation angle sensor and the second motor rotation angle sensor is inappropriate in a case where the detection value of the one of the first motor rotation angle sensor and the second motor rotation angle sensor is inconsistent with the detection value of the steering amount sensor and the detection value of the other of the first motor rotation angle sensor and the second motor rotation angle sensor is consistent with the detection value of the steering amount sensor.

4. The vehicle steering system according to claim 3,
wherein each of the first motor rotation angle sensor and the second motor rotation angle sensor includes a stator attached to a housing of the electric motor and a rotor attached to the single motor rotation shaft, and
wherein the controller is configured to determine that the detection value of the one of the first motor rotation angle sensor and the second motor rotation angle sensor is inappropriate because of a fitting failure of the stator or the rotor of the one of the first motor rotation angle sensor and the second motor rotation angle sensor.

5. The vehicle steering system according to claim 1, wherein the controller is configured to perform, in the detection-value inappropriateness determination, sensor-function-based inappropriateness determination in which it is determined that one of: the detection value of the first motor rotation angle sensor and the detection value of the second motor rotation angle sensor;
and the detection value of the steering amount sensor is inappropriate in a case where the detection value of the first motor rotation angle sensor is consistent with the detection value of the second motor rotation angle sensor and the detection values of the first motor rotation angle sensor and the second motor rotation angle sensor are inconsistent with the detection value of the steering amount sensor.

6. The vehicle steering system according to claim 5, wherein the controller is configured to perform the sensor-function-based inappropriateness determination based on the presence or absence of a delay of a decrease in the detection value of the steering amount sensor generated when the electric motor starts to be controlled for decreasing the steering amount that has increased, the controller determining that the detection value of the steering amount sensor is inappropriate in a case where the delay is being generated and determining that the detection values of the first motor rotation angle sensor and the second motor rotation angle sensor are inappropriate in a case where the delay is not being generated.

7. The vehicle steering system according to claim 6,
wherein the steering amount sensor includes a stator attached to a housing of the steering actuator and a mover attached to the steering rod or the movable member, and
wherein the controller is configured to determine, in the case where the delay is being generated, that the detection value of the steering amount sensor is inappropriate because of a fitting failure of the stator or the mover of the steering amount sensor or backlash in the movable-member moving mechanism.

8. The vehicle steering system according to claim 6, wherein the controller is configured to determine, in the case where the delay is not being generated, that the detection values of the first motor rotation angle sensor and the second motor rotation angle sensor are inappropriate because of backlash in the motion converting mechanism.

9. The vehicle steering system according to claim 1,
wherein the controller is capable of executing the steering amount control based on the detection value of the first motor rotation angle sensor, capable of executing the steering amount control based on the detection value of the second motor rotation angle sensor, and capable of executing the steering amount control based on the detection value of the steering amount sensor, and
wherein the controller is configured to control the steering amount of the wheel not based on any of the detection value of the first motor rotation angle sensor, the detection value of the second motor rotation angle sensor, and the detection value of the steering amount sensor that are determined to be inappropriate in the detection-value inappropriateness determination.

10. The vehicle steering system according to claim 1,
wherein the electric motor is disposed such that the single motor rotation shaft is parallel to the steering rod, and
wherein the motion converting mechanism includes a screw provided on the steering rod, a nut which is provided with a screw threadedly engaging with the screw of the steering rod and which is fitted over the steering rod, and a transmission belt configured to rotate the nut by the rotating motion of the single motor rotation shaft.

11. The vehicle steering system according to claim 1,
wherein the movable member is a rotation shaft, and
wherein the movable-member moving mechanism includes a pinion provided on the rotation shaft and a rack provided on the steering rod so as to be in mesh with the pinion.

\* \* \* \* \*